United States Patent [19]

von Stein et al.

[11] Patent Number: 4,459,018

[45] Date of Patent: Jul. 10, 1984

[54] DEVICE FOR SINGLING OUT NON-REPRODUCIBLE COPIES FED IN A PHOTOGRAPHIC PRINTER

[75] Inventors: Werner von Stein, Hamburg; Wolfgang Zahn; Wilfried Rauskolb, both of Munich, all of Fed. Rep. of Germany

[73] Assignee: AGFA-Gevaert Aktiengesellschaft, Leverkusen, Fed. Rep. of Germany

[21] Appl. No.: 376,841

[22] Filed: May 10, 1982

[30] Foreign Application Priority Data

May 15, 1981 [DE] Fed. Rep. of Germany ....... 3119319
Jul. 3, 1981 [DE] Fed. Rep. of Germany ....... 3126370

[51] Int. Cl.³ ............................................. G03B 27/80
[52] U.S. Cl. ..................................................... 355/68
[58] Field of Search ................................... 355/68, 71

[56] References Cited

U.S. PATENT DOCUMENTS 4,251,157 2/1981 Knör et al. ............................ 355/68
4,379,632 4/1983 Dedden et al. ....................... 355/68

Primary Examiner—Michael L. Gellner
Attorney, Agent, or Firm—Michael J. Striker

[57] ABSTRACT

A device for use in connection with an electronically controlled photographic printer is described which singles out from an advancing band of original copies those which are unsuitable for reproduction. The device includes a splice sensor for indicating the end or the beginning of an order, a sensor of individual pictures in each order, and a quality (sharpness) sensor. A resettable counter is connected to the splice sensor and to the picture scanner to produce an output pulse after a predetermined number of pictures or after the beginning or end of the order. The output pulse is applied to a selection logic circuit which has adjustable sensitivity levels. The selection logic circuit is controlled by the quality sensor to produce a "print" or "non-print" output pulse applied to the printer-controlling electronics. The output pulse from the counter is controlled by switching means to adjust the sensitivity level in the selection logic circuit so as to either ignore the signals from the quality sensor or to adjust the selection circuit to a lower sensitivity for responding to the quality signals.

7 Claims, 2 Drawing Figures

DEVICE FOR SINGLING OUT NON-REPRODUCIBLE COPIES FED IN A PHOTOGRAPHIC PRINTER

BACKGROUND OF THE INVENTION

The present invention relates in general to photographic reproduction of a plurality of original copies, and in particular to a device for singling out non-reproducible original copies from a succession of copies arranged according to respective orders into a continuous band which defines marks indicative of the beginning of an order, of the end of an order, and of the number of copies in respective orders, or the number of reproductions for being processed in a photographic printer.

Devices of this kind are known in photographic copying machines, for example from the German published patent applications 2,753,632 and from U.S. Pat. No. 4,379,632 assigned to the same assignee. The purpose of this prior-art type of device is to recognize non-reproducible negatives and to eliminate them from the copying process. Such non-reproducible negatives are for example unsharp or blurred, underexposed or overexposed, or unintentionally exposed negatives. The disadvantage of the prior-art devices is their susceptibility to indicate also reproducible negatives as unsuitable ones, most frequently in the detection of sharpness, thus eliminating the latter from printing. As a consequence, the customer reclaims his order and becomes dissatisfied with the service. In addition, in 135-films the so-called skip exposure frames at the beginning of the film strip, which upon insertion of the film are taken by amateur photographers, should not be copied.

SUMMARY OF THE INVENTION

It is therefore a general object of the present invention to overcome the aforementioned disadvantages.

More particularly, it is an object of the invention to provide an improved device of the aforedescribed type in which the probability of incorrect decision in the selection process is reduced to a minimum.

In keeping with these objects and others which will become apparent hereafter, one feature of the invention resides, in the provision of a selection circuit which is sensitive to different signal levels and switching over, or switching on or off the threshold levels of the sensitivity of the selection circuit according to the detection of an end mark or according to an adjustable number of copy marks before or after an order end mark, or to the detection of the first reproducible copy within an order.

The invention makes it possible that the selection device can be designed with an increased sensitivity, so that the empty or skip exposure pictures at the beginning of the film are reliably detectable and can be skipped in the printer. The detection or selection logic circuit in the selection device is then switched off, so that no negative is eliminated from the remaining part of a film strip.

Alternatively, the detecting or selecting logic circuit is not switched off but is switched over to a less sensitive level, thus causing only excessively unsharp negatives to be singled out from the main part of the film strip.

This invention also offers the possibility that the switching off or switching over of the sensitivity level of the detecting logic circuit can be made to occur also according to a fixed number of picture marks, when the first reproducible picture is recognized. This alternative has the advantage that, for example after the insertion of a film into the dark chamber, the whole film from the very beginning can be processed by using the selection device set to a lower sensitivity.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
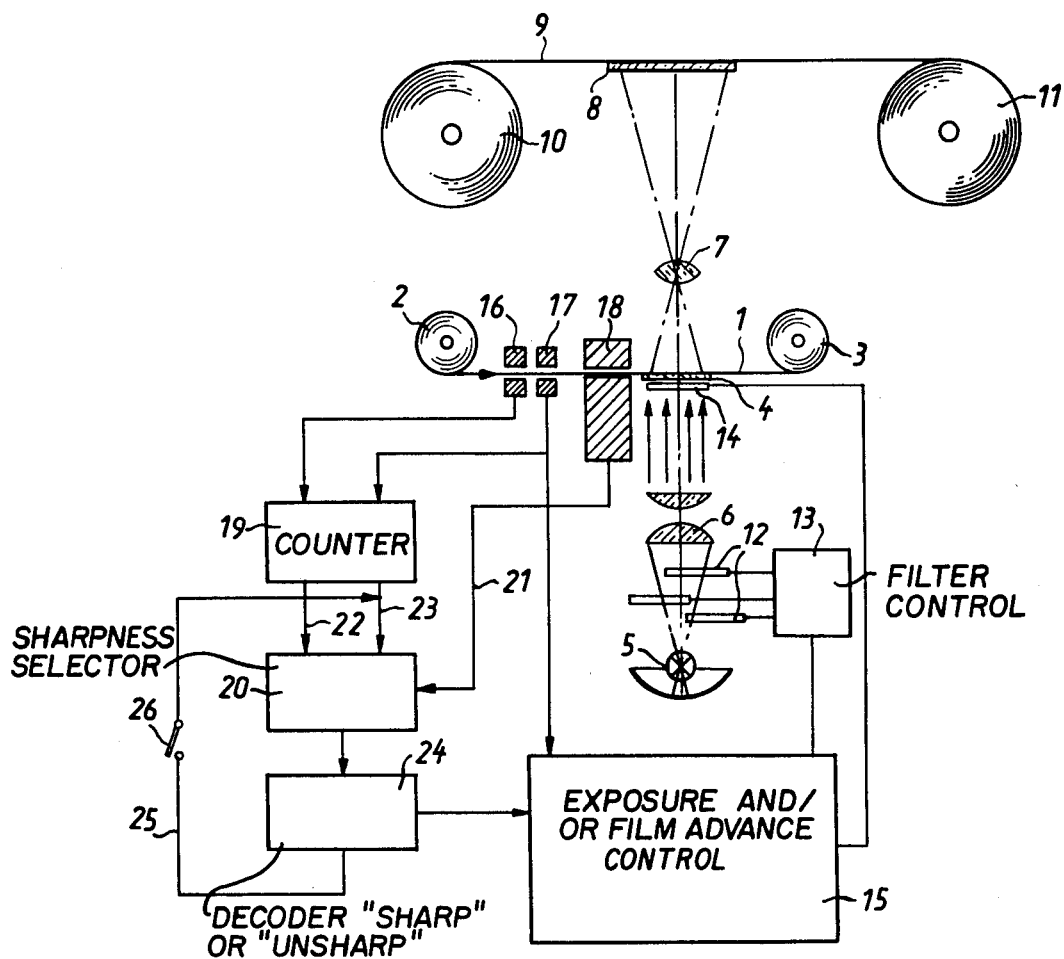
FIG. 1 shows a schematic view of a photographic printer in connection with a block circuit diagram of the device according to this invention.

In FIG. 1, reference numeral 1 indicates a band assembled of series-connected original copies which are unwound from a supply roll 2 and, upon passing through a copying station 4, are coiled on a take-up spool 3. Light from a light source 5 is directed by means of optical element 6 through the plane of the path of movement of the band 1 through the copying station 4, and the image is projected through an optical projection device 7 onto the plane 8 of a positive on which a web of a positive photographic paper 9 is fed from a storage roll 10 to a take-up roll 11.

Color filters 12 are arranged between the light source 5 and the first-mentioned optical element 6 and is controlled by automatic filtering device 13. A shutter 14 is arranged between the copying station 4 and the optical element 6, and together with the filtering device 13 is controlled by an electronic control circuit 15.

Upstream of the copying station 4, a splice sensor 16, a perforation scanner 17, and a quality sensor 18 are arranged in the path of movement of the band of copies 1. The quality sensor in this example is a sensing device 18 for detecting the degree of sharpness of the image. The splice sensor and the perforation scanner are connected respectively to assigned inputs of a pulse counter 19. In addition, the perforation scanner is also connected to one input of the electronic control circuit 15. A reset conductor 22 and a switchover conductor 23 are connected from the outputs of counter 19 to the corresponding inputs of a selection logic circuit 20. Another input of the selection logic circuit is connected through conductor 21 to the sharpness detecting sensor 18. The output of the selection logic circuit 20 is coupled via a decoder 24 to an input of the electronic control circuit 15 and in addition is connected through a conductor 25 and a switch 26 to the switchover input of the selection logic circuit 20.

Figure 2:
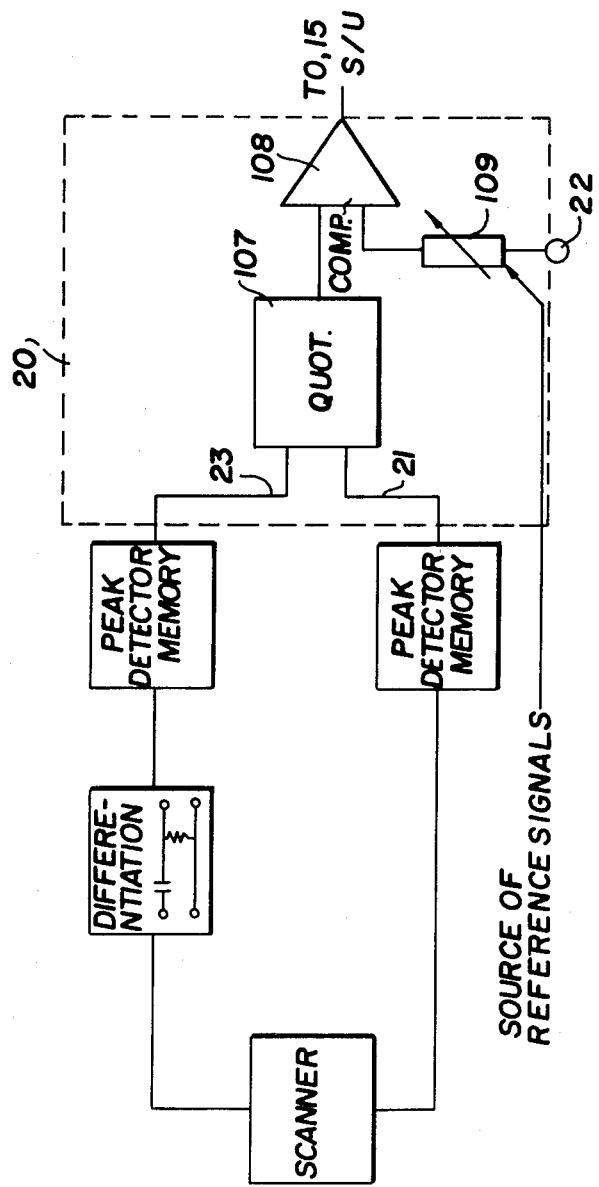
FIG. 2 is an example of a known "image sharpness" selection circuit described in detail in the aforementioned U.S. Pat. No. 4,379,632.

The selection logic circuit 20 of this kind for interpreting sharp or unsharp images is known from prior art and is disclosed in the U.S. Pat. No. 4,379,632, column 8, lines 51-67, for example. A threshold value for determining a demarcation line between sharp and unsharp images is set by the potentiometer 109 leading to conductor 22 (FIG. 2).

In operation, the device of this invention is employed in the following manner:

The film splice sensor 16, on detecting an end mark on the moving band 1 corresponding to the beginning or the end of a film strip representing an order, generates a reset pulse which activates the counter 19 and, through reset conductor 22, activates also the selection logic circuit 20. At the same time, depending upon the selected threshold level in the selection circuit 20, the electronic control circuit receives through decoder 24 a "sharp" or "unsharp" signal, controlling the exposure of the positive paper band 9 through the copy band 1 and the subsequent advance of both bands 1 and 9 or if selectively a command for the advancement of the copy band 1 only. The counter 9 upon being reset also starts counting the pulses generated by the perforation scanner 17 and corresponding to marks indicating respective images in the band 1. After receiving a predetermined number of pulses from the scanner 17, the counter 19 transmits to the logic circuit 20, through the switchover conductor 23, a so-called inhibition impulse which causes the selection logic circuit to transmit through the decoder 24 to the electronic control circuit 15 only a "sharp" signal irrespective of the signals received from the quality sensor 18.

Instead of the aforedescribed mode of operation of the selection logic circuit 20, in which it switches off the data from the quality sensor 18, it is also possible to switch over the circuit 20 to a high sensitivity. For this purpose, the counter 19, in detecting an order end mark, is reset to zero and the logic circuit 20 is adjusted through conductor 22 to a high sensitivity. Upon counting a predetermined number of pulses from the picture mark counter from the scanner 17, the sensitivity of the selection logic circuit is adjusted via switchover conductor 23 to a lower sensitivity value, so that until the next order end mark is reached a "unsharp" signal is generated only in the case of excessively unsharp negatives.

A third switching possibility can be selected under the presumption that, upon detection of a sharp image, no empty exposure pictures will occur. For this case, a conductor 25 with a switch 26 is provided connecting the switchover input 23 to the output of the decoder 24. A recognized "sharp" signal is fed back from the decoder 24 to the switchover input 23 so that by this signal the selection logic circuit is switched over to the lower sensitivity. In other words, this switchover takes place either after the completion of a predetermined number of counts from the scanner 17 or upon the recognition of a sharp negative by the sensor 18 before this preset counting condition is reached in the counter. As long as the counter 19 is adjusted to a high number of counts, the switchover of the sensitivity takes place only after the detection of a sharp negative.

In a modification of this invention, the case is considered where the film strips constituting the individual orders are connected in the band in the reversed direction or if the band of copies is fed through the printer in reverse direction. In this case, the empty or skip exposure pictures are located immediately before the subsequent splicing mark. When the film strips in the band have the same lengths, for example twenty-four fields or thirty-six fields, it would be possible to preset the counter 19 so as to generate a switchover pulse in conductor 23 after the count of twenty-one film fields for the film length of twenty-four fields, and the count of thirty-three for the film length of thirty-six fields. At the same time the selection logic circuit is switched first to a non-sensitive level and, only after counter 19 reaches the preset count is the circuit 20 made sensitive. In practice however, the copy band 1 is composed of film strips of different lengths, and therefore this arrangement has only limited usefulness. For this reason, in this embodiment of the invention, the splice sensor 16 is spaced apart at least about three film fields from the sharpness detecting device 18, and upon detecting an order end mark the selection logic circuit 20 is switched over to a high sensitivity level, and the counter 19 is preset to about six counts, after which number the circuit 20 is switched back to a lower sensitivity again. In this manner, the last three images in a film strip are accurately evaluated, and in any event the first three pictures are evaluated.

From the aforedescribed examples of switching possibilities, the user of this device is now capable to process the films in accordance with all desires of the customer. In particular, the sensitivity levels in the selection logic circuit 20 can be individually adjusted by the user. Provided that the sensitivity level in the logic circuit 20 is set in a lower range, so that a copy is printed which the customer may consider unsharp and be unwilling to accept, then the additional costs for this rejected copy are substantially smaller than the expenditures for a re-order of a copy of an original which is not completely blurred and may still be desired by the customer.

Instead of a sharpness detection, there may be used also other quality indicators, such as for example the correctness of exposure detected as an overexposure or underexposure by a corresponding sensor. In this case, the selection logic would receive generally a "print" or "non-print" signal acting as a command for copying or not copying.

It will be understood that each of the elements described above, or two or more together, may also find a useful application in other types of constructions differing from the types described above.

While the invention has been illustrated and described as embodied in a specific example of a device for singling out non-reproducible copies, it is not intended to be limited to the details shown, since various modifications and structural changes may be made without departing in any way from the spirit of the the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for singling out non-reproducible copies from a plurality of copies to be processed in a photographic printer, the copies being consecutively arranged according to orders and connected into a continuous band which defines marks indicative of the beginning of an order, of the end of an order, and of the number of copies in respective orders, said device comprising sensing means for generating pulses corresponding to said marks on said band; quality sensing means for determining quality of said copies and generating signals indicative of the detected quality; a counter connected to said sensing means to generate an output signal when a predetermined total count is reached; a quality selection circuit operable at different levels of sensitivity and having an input connected to said quality sensing means, a switchover input and a reset input connected to corresponding outputs of said counter; an electronic control circuit for activating the feed and exposure of said photographic printer, said electronic control circuit being controlled by the output of said selection circuit.

2. A device as defined in claim 1, wherein said orders are constituted by film strips formed with marks indicative of the number of fields in each strip; said sensing means including a splice sensor for generating a mark indicative of the beginning or the end of an order, and a perforation counter for generating pulses indicative of the number of individual copies fed through the printer; said quality sensing means including a sharpness detector for generating signals indicative of non-reproducibility or reproducibility of the copies; and said counter delivering upon counting a predetermined number of prints an output signal which in dependence on the selected sensitivity of the selection circuit controls the signals from said quality sensing means.

3. A device as defined in claim 2, wherein the switchover output pulse from said counter adjusts the selection circuit for passing a "print" signal to the electronic control circuit irrespective of the signals from said quality sensing means.

4. A device as defined in claim 2, wherein said selection circuit is adjustable to respond to the switchover output signal of said counter so as to achieve a lower sensitivity level when said sensing means generates a predetermined number of pulses.

5. A device as defined in claim 4, wherein the output of said selection circuit is coupled to the reset input of the latter so that upon the occurrence of a "print" signal at the output of the selection circuit the latter is automatically switched over to a lower sensitivity.

6. A device as defined in claim 2, wherein the splice sensor is spaced apart from the quality sensing means about a distance of several pictures, said splice sensor generating a signal which resets said counter to zero and switches over said selection circuit to a higher sensitivity, and said counter being set to generate an output signal for switching over the sensitivity of the selection circuit to a lower value.

7. A device as defined in claim 2, wherein said quality sensing means is an underexposure or an overexposure sensor.

* * * * *